2,815,333

STABILIZED UNSATURATED POLYESTER COMPOSITIONS AND PROCESS OF MAKING SAME

Jerome G. Klein, Niles, and Edwin W. Meyer, Chicago, Ill., and Leonard C. Grotz, Minneapolis, Minn., assignors to The Glidden Company, Cleveland, Ohio, a corporation of Ohio No Drawing. Application February 28, 1955,
Serial No. 491,222

20 Claims. (Cl. 260—45.4)

This invention relates to novel compositions of matter which are capable of polymerizing. More particularly, it relates to polymerizable compositions comprising polyesters of polyhydric alcohols and ethylenically unsaturated polycarboxylic acids and a material adapted to prevent the premature gelation of the polymerizable composition. Especially, our invention relates to a novel process for stabilizing such compositions, and to polymerizable compositions in which an isothiouronium salt is present as a stabilizing agent.

It has long been known that polymerizable unsaturated alkyd resins and especially those derived from mixtures of esters of polyhydric alcohols and $\alpha,\beta$-unsaturated polycarboxylic acids readily react between the ethylenic groups of the polyester to form useful polymeric products.

It has been known also to admix such polymerizable compositions with ethylenically unsaturated compounds and by heating the resultant mixture to effect a copolymerization of the mass. This copolymerization occurs even at room temperature in instances of highly reactive components, often with the evolution of considerable heat, which serves to accelerate the reaction once it is started. A highly reactive mixture of a polyester of maleic or fumaric acid and diethylene glycol, together with a vinylic compound such as styrene, will commence to gel (i. e., to copolymerize) almost as once, even at room temperature.

This undesirable characteristic of copolymerizable mixtures to react prematurely was recognized by Ellis, who in U. S. Patent No. 2,255,313, proposed to inhibit such premature reaction by the admixture of an $\alpha$-cellulose in the composition.

Subsequently, with the growth of the field of application of copolymerizable resinous compositions in the plastics art, an intensive search was made for improved means of reducing this tendency of polymerizable compositions to undergo premature reaction. This search centered on providing polymerizable compositions comprising an ester of polyhydric alcohol and an $\alpha,\beta$-unsaturated polycarboxylic acid and mixtures of such polyesters with a polymerizable ethylenically unsaturated compound which compositions possessed some, and desirably all, of the following characteristics:

(1) Prior to incorporation of polymerization catalyst, the mixture will have an acceptable shelf life, i. e., the polymerizable composition will not undergo premature reaction.

(2) After addition of catalyst, the mixture will not polymerize prior to use, i. e., the catalyzed mixture will have a serviceable "pot life."

(3) The catalyzed mixture will not be adversely affected with respect to curing time, i. e., the polymerization reaction will not be unduly prolonged or extended at the predetermined reaction temperature.

(4) The polymerized resin will undergo a minimum of discoloration, pitting, cracking and other undesirable defects during curing and aging.

(5) The rate of cure will be accelerated. To date, efforts in this direction have resulted in the testing of a host of compounds, none of which has been completely satisfactory. Among the numerous types of compounds which have been advanced as stabilizers for this variety of polymerizable mixtures, have been polyhydric phenols, quaternary ammonium compounds and amine salts. However, although these compounds do retard gelation in storage, such are objectionable for one or more reasons. Although many have been found to be efficient as stabilizers in preventing the premature gelation of the mass, they continue to prevent, or at least unduly retard polymerization, even after the addition of catalyst(s). Thus, the presence of 0.01% by weight of 4-t-butyl catechol has been found to prevent polymerization of a polyester-styrene copolymer mixture catalyzed by the addition of 1% of benzoyl peroxide for a period in excess of 3½ hours at 125° F. Thus, the first stabilizers devised by the art acted also to prevent polymerization at the curing temperature within the practical range, which led to objectionably high curing temperatures, too rapid, and/or incomplete cures. Accordingly, those stabilizers known to the art were of limited utility.

It is, therefore, an object of this invention to provide improved stability in polymerizable unsaturated alkyd compositions and/or solutions thereof in ethylenically unsaturated polymerizable monomer(s).

Another object is to provide a group of compounds which act to prevent premature gelation of uncatalyzed polymerizable unsaturated polyester compositions and which act after the addition of polymerization catalyst(s) to accelerate the rate of cure of compositions of the type specified last above.

Other objects will be apparent from the following description of our invention.

We have made the surprising discovery that isothiouronium salts are effective as stabilizers when present in relatively minor amounts in polymerizable unsaturated alkyd resin compositions containing or not polymerizable ethylenically unsaturated monomer(s). After the addition of catalysts capable of promoting polymerization, such mixtures retain their stability at ordinary temperatures, and in certain instances upon being heated to the curing temperature, the cure is accelerated. An additional advantage of this novel group of stabilizers lies in the absence of excessive discoloration in the resulting cured resin.

Although all isothiouronium salts possess the ability to retard gelation of polymerizable unsaturated polyesters and mixtures thereof with ethylenically unsaturated compounds, the several specific members of this class will vary with respect to their efficacy to alter the rate of cure and pot life of the stabilized composition. Thus, salts of such acids as sulfuric and acetic acids, while highly efficient as stabilizers, are somewhat lacking in ability to advantageously affect the rate of cure. The salts of the halogen acids, and especially the bromides and chlorides, are, in general, excellent stabilizers, pot life extenders and curing rate promoters, and accordingly represent the preferred members of this family of stabilizers. Many of the isothiouronium salts which we have found to act as stabilizers are known in the art as chemical compounds. All such compounds can be represented by the following general formula:

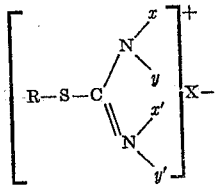

wherein R can be alkyl, aryl, aralkyl, alkyaryl, alkylene, cycloalkyl, hydroxyalkyl; $x$ can be hydrogen or R; $x'$, $y$, $y'$ can be alike or different and are defined as $x$ has been.

Further $x$ and $x'$ or $y$ and $y'$ can be such as to form a polymembered ring with the carbon and two nitrogens of this formula, in which instance the remaining $y$ and $y'$ or $x$ and $x'$ preferably stand for hydrogen. X is the negative radical of a non-oxidizing acid.

The wide structural variation possible in the group of isothiouronium salts, suitable for use according to our invention, is indicated by the following typical examples:

S-n-butylisothiouronium bromide
S-t-butylisothiouronium chloride
S-ethylisothiouronium bromide
S-dodecylisothiouronium bromide
S-benzylisothiouronium acetate
S-benzylisothiouronium succinate
S-benzylisothiouronium myristate
S-benzylisothiouronium-p-toluene sulfonate
S-cyclohexylisothiouronium chloride
S-methylisothiouronium chloride
S,S'-ethylenediisothiouronium bromide
S-isobornylisothiouronium p-toluenesulfonate
S-β-hydroxyethylisothiouronium bromide
S-allylisothiouronium bromide
S-2,4-nitrophenylisothiouronium chloride
1,3-diphenyl-2-allyl-2-thiopseudouronium bromide
1,3-diethyl-2-benzyl-2-thiopseudouronium chloride
1,3-ethylene-2-allyl-2-thiopseudouronium bromide The preparation of isothiouronium salts is known to the art. In general, we have found it convenient to dissolve thiourea, or a derivative thereof, in a suitable organic solvent and to heat the solution to boiling under reflux. Thereafter, an equimolecular quantity of the organic halide, or other salt, is added gradually. Usually sufficient heat is generated by the reaction to maintain the mixture at a boil without external application of heat. Thereafter, the solvent may be evaporated to obtain the product, which usually is sufficiently pure to be used directly. The preparation of S-benzylisothiouronium chloride will be used to illustrate this general method. A solution of 2280 grams of thiourea in 6 liters of isopropanol was heated to its boiling point under reflux. With no further external heating the solution was maintained at the reflux point temperature by the careful addition of 3798 grams of benzyl chloride. Thereafter, the mixture was rapidly chilled to incipient crystallization. The product was isolated by filtration and the filter cake washed with cold acetone. The washed product was dried in a hot air oven. Thusly, 5371 grams of product melting at 174° to 176° C. were obtained. The mother liquor can be treated to yield a further quantity of material.

Some of the isothiouronium salts are not crystallized products. The preparation of such is illustrated by the synthesis of S-β-carbothoxyethylisothiouronium bromide.

A mixture of 15.3 grams of β-bromopropionic acid and 7.6 grams of thiourea was dissolved in 50 cc. of ethanol. The solution was boiled under reflux for about three hours, and thereafter, the solvent was removed by distillation, the final traces being taken off in vacuo. A colorless oil, completely soluble in water, remained.

The use of substituted thiourea compounds is illustrated by the following preparation of 1,3-diphenyl-2-allyl-2-thiopseudouronium bromide.

A mixture of 11.5 grams of 1,3 diphenylthiourea, 6.1 grams of allyl bromide and 25 cc. of ethanol was boiled under reflux for ½ hour. The mixture was permitted to stand for about 16 hours in an ice chest, and the resultant slurry was filtered, the solid washed with cold ethanol, and the washed cake dried. The product melted at 178° to 180° C.

In an analogous manner, equimolecular proportions of benzyl chloride and ethylenethiourea produced 1,3-ethylene-2-benzyl-2-thiopseudouronium chloride, M. P. 171–173° C. (from ethanol).

The isothiouronium salts vary somewhat in their solubility in the polyester mass. Generally, only limited amounts of the order of 0.01% to 0.5% by weight of the mass are sufficient to impart the stabilizing and other desirable effects. The salts can be introduced into the unsaturated polyester mixture, either hot or cold, in the form of aqueous or organic solutions, or directly, as desired or convenient. Such introduction is preferably accomplished before any vinylic or other polymerizable ethylenically unsaturated compound is added. The preparation of the polyester-ethylenically unsaturated monomer mixture can be carried out in a manner well known in the art. The preparation of the polyester is generally effected in the presence of an organic solvent and is carried to a predetermined degree of esterification.

After removal of the volatile solvent, it is often desired to incorporate the monomeric constituent(s). However, such a mixture will polymerize at this stage, even if the mass is cooled immediately after admixture of the monomer. By incorporating an isothiouronium salt in the hot polyester and then adding the monomeric material, this premature polymerization is effectively prevented. The stabilized mixture can then be cooled to and maintained at the desired storage temperature for extended periods without danger of premature gelation. Thus, a margin of safety is provided in the manufacturing process, the advantages and benefits of which are obvious.

The following examples will illustrate the preparation of the compositions of our invention:

EXAMPLE 1

*Preparation of polyester—(A)*

A mixture of 22.6 mols of propylene glycol, 10 mols of maleic acid anhydride, 10 mols of phthalic acid anhydride was added to 8% by weight of xylene. The mixture was heated to and maintained between 320° and 360° F. under reflux conditions until the acid number of the mass was 50 to 52. The solvent was removed in vacuo, and the residue cooled to about 75° F.

*Preparation of polyester-styrene mixture—(B)*

To 350 grams of the polyester preparation of part A, above, heated to 235° to 240° F., were added 0.05 gram of 4-t-butyl catechol and 0.25 gram (0.05% by weight of the finished polyester-styrene mixture) of S-benzylisothiouronium chloride dissolved in a minimum amount of propylene glycol. The mixture was agitated to thoroughly disperse the stabilizer and then 150 grams of styrene was added. The mixture was heated to 200° F. and then filtered.

Alternatively, the S-benzylisothiouronium chloride can be added to the polyester-styrene mixture after it has been cooled to 75° F.

In an analogous fashion, other isothiouronium salts were incorporated in the polyester-styrene mixture, and the mixtures were tested for gel time, pot life and storage life, as described below. The results of these tests are set out in the table following:

TABLE I

| Stabilizer | Gel time [1] | Stability 72° F., Months | 135° F., Days | 200° F., Hours | Pot life [2] |
|---|---|---|---|---|---|
| Polyester—no stabilizer | ([3]) | | | | |
| S-benzyl-isothiouronium chloride | 360 | 6 | 12 | 4-5 | 3-4 |
| S-cyclohexyl-isothiouronium chloride | 360 | | | | |
| S-methyl-isothiouronium sulfate | 4,700 | | | | |
| S,S'-ethylenediisothiouronium bromide | 3,500 | | | | |
| S-t-butyl-isothiouronium chloride | 720 | 3.0 | 3.0 | 5.0 | 12 |
| S-isobornyl-isothiouronium-p-toluene sulfonate | 3,200 | | | | |
| S-lauryl-isothiouronium bromide | 350 | | | | 0.25 |
| S-lauryl-isothiouronium chloride | 340 | 6 | 1 | 0.75 | 2-3 |
| S-2-hydroxyethyl-isothiouronium chloride | 265 | 0.75 | | | 2-3 |
| S-allyl-isothiouronium bromide | 280 | 0.5 | | | 0.25 |
| S-β-phenoxyethyl-isothiouronium bromide | 240 | 0.5 | | | 0.25 |
| S-benzyl-isothiouronium acetate | 2,700 | | | | |
| S-2,4-dinitrophenyl-isothiouronium chloride | 400 | | | | 3-4 |
| S-β-carbethoxy-isothiouronium chloride | 270 | | | | 3-4 |
| S-allyl-isothiouronium chloride | 310 | 4.0 | | | 3-4 |
| 1,3-diphenyl-2-allyl-2-thiopseudouronium bromide | 395 | 1.5 | | | 5 |
| 1,3-diphenyl-2-benzyl-2-thiopseudouronium chloride | 350 | 0.75 | | | 2 |
| 1,3-diphenyl-2-allyl-2-thiopseudouronium chloride | 315 | | | | 2-3 |
| 1-phenyl-2-benzyl-thiopseudouronium chloride | 350 | | | | 3-4 |
| 1,3-diethyl-2-benzyl-thiopseudouronium chloride | 325 | | | | 3-4 |
| 1,3-diethyl-2-allyl-thiopseudouronium bromide | 390 | | | | 3-4 |
| 1,3-ethylene-2-benzyl-2-thiopseudouronium chloride | 230 | 3.0 | | | 2-3 |
| 1,3-ethylene-2-allyl-2-thiopseudouronium bromide | 230 | | | | 2-3 |
| 1,3-diisopropyl-2-benzyl-2-thiopseudouronium chloride | 320 | 3.0 | | | 2-3 |
| 1,3-diisopropyl-2-allyl-2-thiopseudouronium bromide | 235 | >6.0 | | | 2-3 |
| 1,3-dibutyl-2-benzyl-2-thiopseudouronium chloride | 320 | | | | 3-4 |
| 1,3-dibutyl-2-allyl-2-thiopseudouronium chloride | 295 | | | | 3-4 |
| S-benzyl-isothiouronium-p-toluene sulfonate | 3,300 | 1.0 | 2.0 | 2.0 | 24 |
| S-benzyl-isothiouronium hydrogen sulfate | 6,300 | 3.3 | 1.0 | 1.0 | 24 |

[1] Gel time is determined by adding 0.05% (by weight) of t-butyl hydroperoxide to 100 grams of the unpolymerized polyestermonomer composition containing 0.01% 4-t-butyl catechol and 0.05% of the isothiouronium salt. A 30 gram portion of this mixture is weighed into a 25 x 150 mm. test tube which then is immersed in a water bath maintained at 160° F. The time interval from immersion to the first appearance of gel particles in the catalyzed mass is taken as the "Gel time."
[2] Pot life is determined by maintaining a sample of the above-prepared catalyzed mixture at about 75° F. until gelation has occurred.
[3] Gelled on preparation.

EXAMPLE 2

To 700 grams of propylene maleate phthalate at 260° F., prepared as in part A of Example 1 above, was added 0.5 gram of S-benzylisothiouronium salt. The mixture was permitted to cool to 240° F. and 300 grams of styrene was mixed into the mass. The mixture was then held at 200° F. for four hours and examined for evidence of gelation. None could be detected, and hence, this test was evidence of the stabilizing character of the isothiouronium salt. A similar preparation omitting the isothiouronium salt gelled in preparation.

In a similar fashion, a mixture of 700 grams of part A propylene maleate phthalate, 0.5 gram of S-benzylisothiouronium chloride, 0.1 gram of 4-t-butyl catechol (a polymerization inhibitor) and 300 grams of styrene was held at 200° F. In this instance also, no evidence of gelation could be detected after four hours.

EXAMPLE 3

Propylene maleate phthalate was stabilized with 0.1% by weight of S-laurylisothiouronium chloride and 0.02% by weight 4-t-butyl catechol, and thereafter an equal weight of diallyl phthalate was added. This mixture was stable for in excess of 25 days at 150° F., and in excess of 100 days at 72° F.

Replacement of the S-laurylisothiouronium chloride by an equal weight of S-benzylisothiouronium chloride resulted in a copolymerizable polyester mixture of comparable stability.

A similar mixture, free of stabilizer, gelled within twelve hours at 150° F. The stabilized mixtures, upon addition of a polymerization catalyst, e. g., methyl ethyl ketone peroxide "DDM"), and heating in the usual manner, polymerized readily to hard and clear products.

EXAMPLE 4

The isothiouronium salts are characterized as illustrated above by their ability to retard premature gelation of copolymerizable polyester-monomer mixtures. In order to be most useful in commercial application, it is also desirable that such stabilizers should not continue to exhibit this inhibitory effect to any marked degree when the mixture is catalyzed with a polymerization catalyst. In fact, it is eminently desirable that the polymerization be effected speedily and that the heat of polymerization be liberated smoothly. Too rapid evolution of heat gives rise to uneven cure, which results in stains and other imperfections in the finished resin product.

The behavior of the isothiouronium salts during the polymerization reaction has been found, surprisingly, to be accelerating rather than retarding. Further, we have found that the maximum temperature reached within the polymerizing mass is not unduly excessive.

These surprising features of our novel stabilizers were demonstrated by the well-known "peak exotherm" test in which a stabilized polyester-monomer mixture was prepared, and to 100 grams of said mixture was added 2 grams of a 50–50 mixture of benzoyl peroxide and tricresyl phosphate to catalyze the copolymerization. A 40 gram portion of the catalyzed mixture was weighed into a test tube (25 mm. x 150 mm.) and this was immersed in a water bath maintained at 180° F. By means of a conventional thermocouple and temperature recorder, the temperature of the mixture was determined. The time required for the temperature to rise from 150° F. to the maximum, which is the so-called "peak exotherm," was observed. The results of a number of such tests are given in the following table. This test is generally accepted as one providing an indication of the rate at which a catalyzed mixture will cure when heated.

TABLE 2

| Stabilizer | Total reaction time from 150° F. to "PE", minute | Peak exotherm, °F. | Gel time, sec. |
|---|---|---|---|
| (1)=0.015% hydroquinone | 4.75 | 419 | 18,000 |
| (1)+0.05% S-benzyl-isothiouronium chloride (SBIC) | 4.75 | 397 | 1,340 |
| (1)+0.1% SBIC | 4.75 | 397 | 1,260 |
| (1)+0.05% S-t-butyl isothiouronium chloride (TBIC) | 4.50 | 402.5 | 1,500 |
| (1)+0.1% TBIC | 4.25 | 396 | 1,775 |
| (2)=0.025% 4-t-butyl catechol (4-TBC) | 5.13 | 419 | 16,200 |
| (2)+0.05% SBIC | 5.0 | 409 | 568 |
| (2)+0.1% SBIC | 5.25 | 402.5 | 565 |
| (2)+0.05% TBIC | 5.2 | 412 | 405 |
| (2)+0.1% TBIC | 5.38 | 406 | 465 |
| 0.02% 4TBC+0.5%: | | | |
| 1,3-ethylene-2-benzyl-2-thiopseudouronium chloride | 6.75 | 412 | 237 |
| 1,3-diisopropyl-2-allyl-2-thiopseudouronium bromide | 7.75 | 412 | 516 |
| 1,3-diethyl-2-benzyl-2-thiopseudothiouronium chloride | 6.75 | 420 | 375 |
| 1,3-diethyl-2-allyl-2-thiopseudouronium bromide | 8.25 | 405 | 433 |
| 1,3-dibutyl-2-benzyl-2-thiopseudouronium chloride | 6.25 | 406 | 381 |
| 0.01% 4TBC+0.05% S-lauryl-isothiouronium chloride | 7.5 | 420 | 340 |

(1) Designates 0.015% hydroquinone.
(2) Designates 0.025% 4-t-butyl catechol (4TBC).
The polyester composition of Example 1, part A, was used in these tests.

The polymerizable polyester compositions which are useful in practicing the principles of this invention are well known in the art. Such compositions, per se, constitute no part of our invention. The preparation and multitudinous variations in the preparation of the polymerizable compositions containing polyesters of polyhydric alcohols and ethylenically unsaturated polycarboxylic acids are described in various patents and publications relating to this general field of the polymer art. It should be pointed out also that such compositions may, and usually do, contain other ingredients, such as ethylenically unsaturated monomeric substances, pigments, fillers, modifying resins, solvents, plasticizers, inhibitors, other stabilizers, polymerization catalysts, mold lubricants, extenders, and the like. The formulation, curing and further treatment of such compositions likewise are well known to those skilled in the polymer art and form no part of our invention. No extended discussion of these well-known collateral aspects of this art is believed necessary, except to refer to the following patents and co-pending applications which are typical of the art: Application Ser. No. 307,703, filed September 3, 1953; application Ser. No. 377,265, filed August 28, 1953 and U. S. Patents 2,453,655, 2,593,787, 2,409,633, 2,433,735–2,443,741, 2,450,552, 2,255,313, 2,512,410, 2,280,256, 2,453,666, 2,610,168, 2,635,089. The polymerizable unsaturated alkyd compositions can be broadly defined as being polymerizable unsaturated polyhydric alcohol-polycarboxylic acid polyesters whose molecules contain a plurality of polymerizably reactive $\Delta^{2,3}$-enedioyl groups, i. e., groups having the structure

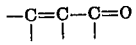

in dioyl radicals of the polyester molecule.

It is common practice in this art to introduce a minor quantity of a phenolic or quinoid substance, e. g., 4-tertiary butyl catechol hydroquinone, quinone and the like, as an auxiliary stabilizer to insure the stabilization of the mixtures to which our invention pertains and to retard the formation of self-polymerization products of the monomeric constituent, e. g., polystyrene, prior to use. This practice is not essential but as said above is an auxiliary measure. In the instances described in the above examples, the stability of the compositions prepared would be adequate without the addition of the auxiliary agent.

Having described our invention, what we claim is:

1. A polymerizable composition comprising a polymerizable unsaturated polyhydric alcohol-polycarboxylic acid polyester whose molecule contains a plurality of polymerizably reactive $\Delta^{2,3}$-enedioyl groups, and a small stabilizing amount of an isothiouronium salt of an acid not more strongly oxidizing than sulfuric acid, said small stabilizing amount being effective to delay the gelation of said composition in the absence of polymerization catalyst when compared with a similar composition from which said small stabilizing amount has been omitted.

2. A composition of matter comprising a polyester of a dihydric alcohol and an $\alpha,\beta$-ethylenic, $\alpha,\beta$-dicarboxylic acid, said polyester being protected against premature gelation in the absence of polymerization catalyst by a small stabilizing amount of an isothiouronium salt of an acid not more strongly oxidizing than sulfuric acid.

3. A composition of matter comprising a polymerizable unsaturated polyester of an ethylenically unsaturated dicarboxylic acid and a dihydric alcohol, said polyester containing in solution a small stabilizing amount of isothiouronium salt of an acid not more strongly oxidizing than sulfuric acid effective to delay the gelation of said polyester in the absence of polymerization catalyst when compared with a similar composition from which said small stabilizing amount has been omitted.

4. A composition of matter comprising a mixture of (A) liquid polymerizable, ethylenically unsaturated compound, (B) polymerizable unsaturated polyhydric alcohol-polycarboxylic acid polyester which is soluble in said ethylenically unsaturated compound and whose molecules contain a plurality of polymerizably reactive $\Delta^{2,3}$-enedioyl groups, and (C) a small stabilizing amount of an isothiouronium salt of an acid not more strongly oxidizing than sulfuric acid, said small dissolved amount being effective to delay the gelation of said composition in the absence of polymerization catalyst when compared with a similar composition from which said small stabilizing amount has been omitted.

5. A composition as claimed in claim 4 wherein said liquid polymerizable ethylenically unsaturated compound is a vinylic compound.

6. A composition as claimed in claim 5 wherein said vinylic compound is styrene.

7. A composition as claimed in claim 4 wherein the polycarboxylic acid of said polyester is an ethylenically unsaturated dicarboxylic acid.

8. A composition as claimed in claim 7 wherein said ethylenically-unsaturated dicarboxylic acid is an $\alpha,\beta$-ethylenic, $\alpha,\beta$-dicarboxylic acid.

9. A composition as claimed in claim 8 wherein said liquid polymerizable ethylenically-unsaturated compound is a vinylic compound.

10. A composition as claimed in claim 9 wherein said vinylic compound is styrene.

11. A polymerizable composition comprising a polymerizable unsaturated polyhydric alcohol-polycarboxylic acid polyester whose molecule contains a plurality of polymerizably reactive $\Delta^{2,3}$-enedioyl groups, and a small stabilizing amount of at least one compound having the general formula

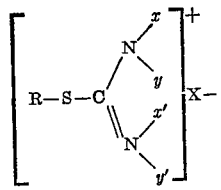

wherein R is selected from the group consisting of alkyl, aryl, aralkyl, alkaryl, alkylene, cycloalkyl and hydroxyalkyl, wherein $x$, $y$, $x'$ and $y'$ can be dissimilar and are selected from the group consisting of hydrogen, alkyl, aryl, aralkyl, alkaryl, alkylene, cycloalkyl and hydroxyalkyl, and wherein X is a negative radical of an acid not more strongly oxidizing than sulfuric acid, said small stabilizing amount of said compound being effective to delay the gelation of said composition when compared with a similar composition from which said small stabilizing amount has been omitted.

12. A composition as claimed in claim 11 wherein said composition includes a liquid polymerizable ethylenically-unsaturated compound.

13. A composition as claimed in claim 12 wherein said liquid polymerizable ethylenically-unsaturated compound is a vinylic compound.

14. A composition as claimed in claim 13 wherein said vinylic compound is styrene.

15. The method of retarding the gelation of a composition which (a) comprises a polymerizable unsaturated polyhydric alcohol-polycarboxylic acid polyester whose molecule contains a plurality of polymerizably reactive $\Delta^{2,3}$-enedioyl groups and (b) is free of added polymerization catalyst, which comprises adding to and dissolving in said composition a small stabilizing quantity of at least one isothiouronium salt of a non-oxidizing acid, in an amount effective to delay said gelation when compared with a similar composition from which said small stabilizing quantity has been omitted.

16. The method as claimed in claim 15 wherein said composition includes liquid polymerizable ethylenically-unsaturated compound forming a homogeneous liquid solution with said polyester.

17. The method as claimed in claim 16 wherein said liquid polymerizable ethylenically-unsaturated compound is a vinylic compound.

18. The method as claimed in claim 17 wherein said vinylic compound is styrene.

19. The method as claimed in claim 15 wherein said small stabilizing quantity of at least one isothiouronium salt is composed of at least one compound having the general formula

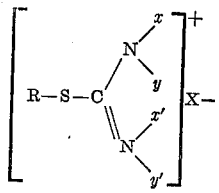

wherein R is selected from the group consisting of alkyl, aryl, aralkyl, alkaryl, alkylene, cycloalkyl and hydroxyalkyl, wherein $x$, $y$, $x'$, $y'$ can be dissimilar and are selected from the group consisting of hydrogen, alkyl, aryl, aralkyl, alkaryl, alkylene, cycloalkyl and hydroxyalkyl, and wherein X is a negative radical of an acid not more strongly oxidizing than sulfuric acid.

20. The method as claimed in claim 19 wherein said composition includes liquid polymerizable ethylenically-unsaturated compound forming a homogeneous liquid solution with said polyester.

References Cited in the file of this patent

UNITED STATES PATENTS

| | | |
|---|---|---|
| 2,593,787 | Parker | Apr. 22, 1952 |
| 2,627,510 | Parker | Feb. 3, 1953 |
| 2,646,416 | Parker | July 21, 1953 |

FOREIGN PATENTS

| | | |
|---|---|---|
| 666,640 | Great Britain | Feb. 13, 1952 |